H. M. Remington.
Mincing Knife.
No. 2,659. Reissued Jun. 25, 1867.
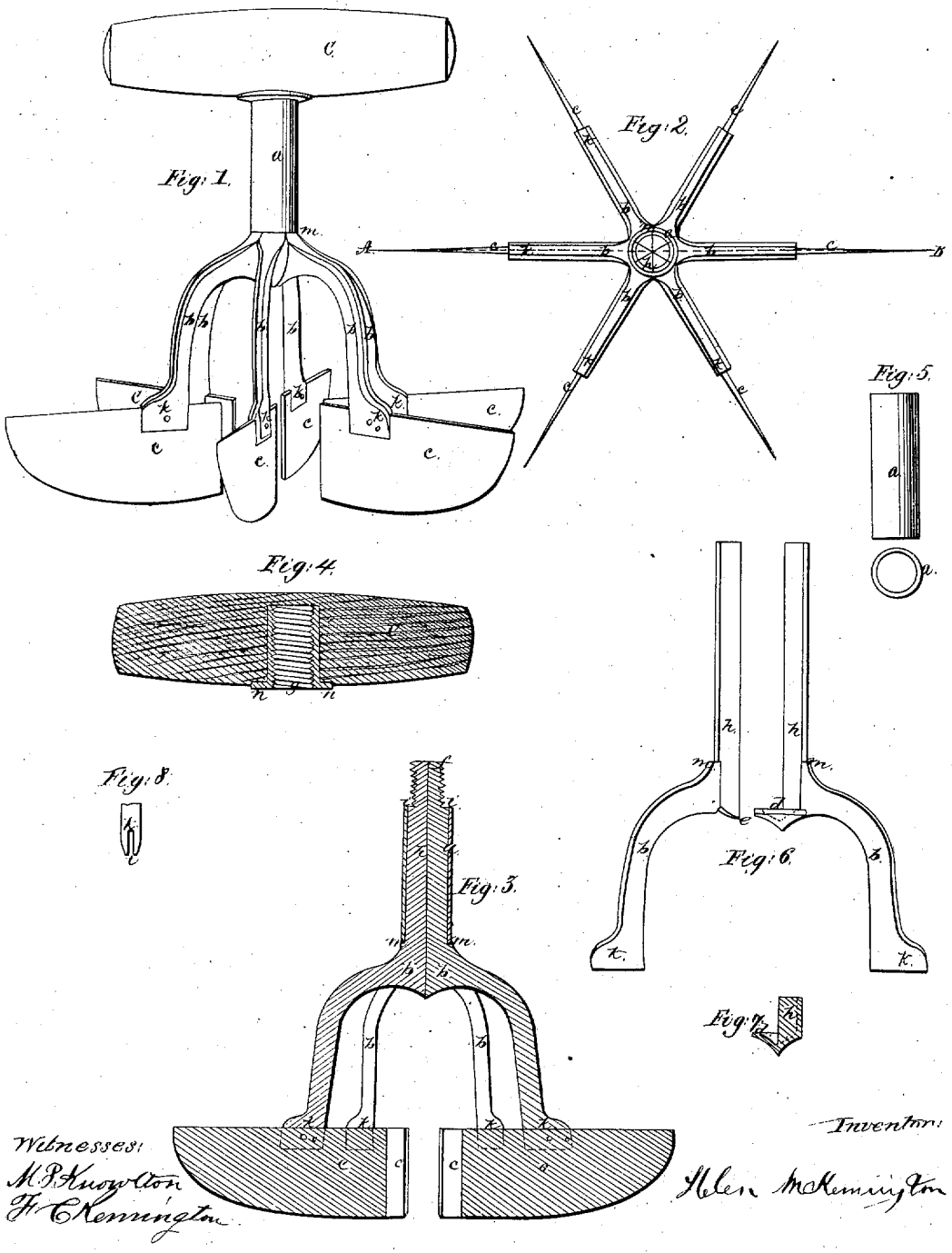
Witnesses:
M. P. Knowlton
F. C. Kennington
Inventor:
Helen McKennington
PETERS, PHOTO-LITHOGRAPHER, WASHINGTON, D. C.

United States Patent Office.

HELEN M. REMINGTON, OF SPRINGFIELD, MASSACHUSETTS.

*Letters Patent No.* 61,954, *dated February* 12, 1867; *reissue No.* 2,659, *dated June* 25, 1867.

IMPROVED MINCING-KNIFE.

The Schedule referred to in these Letters Patent and making part of the same.

TO WHOM IT MAY CONCERN:

Be it known that I, HELEN M. REMINGTON, of the city of Springfield, in the county of Hampden, and Commonwealth of Massachusetts, have invented a new and useful improved Mincing-Knife; and I do hereby declare that the following is a full, clear, and exact description thereof, reference being had to the accompanying drawings, making a part of this specification, and to the letters of reference marked thereon, in which—

Figure 1 is a perspective view.

Figure 2 is a plan view.

Figure 3 is a vertical section through line A B of fig. 2.

Figure 4 is a vertical longitudinal section of the handle C.

Figure 5 is a plan and elevation of the ring or clamp.

Figure 6 is an elevation showing the cup *d* and point *e* fitting into it.

Figure 7 is a vertical section of part of the stem *h* and cup *d*; and

Figure 8 is an elevation of the foot *k*, showing slot for the knife.

The nature of my invention consists in multiplying or increasing the number of blades in a hand-knife used in mincing meat, so that there shall be a much greater total length of cutting edge operating at the same time than by the usual method of using one blade, and this, too, without any considerable increase of expense over the common hand-knife having only one blade. I accomplish this by grouping or using three or more knives or blades, made as hereinafter described, in such manner as that they shall be firm and strong, and using them in the same way as the common mincing-knife of one blade is used. I am aware that three or more knives have been used together for mincing meat, but they have been connected with, and were dependent upon, the operation of expensive and complicated machinery, which has rendered the use of such knives almost impracticable for common domestic use. My method of grouping a number of knives together entirely removes these objections, as they can be manufactured with any small number of blades without any great increase of expense over the common mincing-knife, and at the same time are so free from complication, that when made in sections any ordinary servant can use, separate, clean, and put them together again, without any inconvenience or trouble whatever.

To enable others skilled in the art to make and use my invention, I will proceed to describe its construction and operation.

I make the shank to which is attached the handle in three or more sections or portions, six sections or portions being shown on the drawing, so that when the number used are put together they shall form, collectively, a cylindrical shank, as shown in fig. 1, or as would be shown in an elevation—fig. 3 showing a vertical section of the same. The part *h* terminates in the curved leg *b* at the lower end, at the bottom of which leg *b* is the foot *k*, having a vertical longitudinal slot made in it, into which slot is inserted the knife or blade *c*, which may be kept in place by the rivets *o o*. The upper end of the part *h* is made somewhat smaller than the main portion, and having a shoulder at *i*. The cylindrical clamp or ring *a* is made so that when the several parts *h h* are put together and form a cylinder, the inside of the cylindrical clamp or ring *a* shall fit on to the cylindrical shank, and shall firmly hold the several parts of said shank together, forming a firm, round shank. At *m* is a shoulder, against which the cylindrical clamp or ring *a* stops, when it is forced down over the shank formed from these sectional portions *h h*. When these parts *h h* are thus put together, and a round shank is thus formed, a screw-thread, *f*, is cut upon the upper end of the sectional parts *h h* collectively forming said shank. A hole is made in the middle of the handle C, and into this hole is firmly inserted the socket *g*, which may be held in place either by elongating any portion of it, or by a key, or by any other suitable means; and in the socket *g* is cut a female screw-thread, which fits the screw-thread *f* cut upon the upper end of the cylindrical shank. Instead of the socket *g* being inserted in the handle C, I may use a ring, of sufficient width, passing around or slipped on to the handle C, and of sufficient thickness and strength to have a hole made in one side, and a female screw-thread cut in that, which may answer the purpose of a socket, and which I consider as its equivalent. The handle is then screwed down upon the shank tightly, and the portion *n* of the socket *g* strikes against the top of the cylindrical clamp or ring *a*, and forces it down upon the shoulder *m*, while the operation of the screw-threads at the top of the shank pulls up the several portions of the shank, and thus holds them tightly in place. To facilitate the putting together of the sectional parts *h h* to form a shank, I number the sectional parts *h h* on the top or other convenient place, or letter them, or use any other suitable marks or arrangement. And to still further facilitate putting them together, I use the device shown in figs. 6 and 7, where, upon one only of the sectional parts *h*, is a hollow or indented projection or shoulder, forming a kind of cup, *d*. Into this cup or concave shoulder *d* the point or part *e* is made to fit, and, to put the several parts together, it is only necessary to place their points *e e* side by side into this cup *d*, taking care to keep the continuity of the screw-thread *f*, which may be done either by the numbering before mentioned, or any other suitable marks, so that the handle C may be screwed on readily.

In manufacturing these mincing-knives in sectional parts, the part *h*, the leg *b*, and the knife *c* may be made all in one piece, either by swaging or casting, thus rendering its manufacture comparatively cheap, and within the reach of all who would use a mincing-knife; and its manufacture in sections would greatly facilitate its shipment in quantities, as it is thus capable of being packed in much less space when taken apart, and is consequently less liable to breakage in transportation, as the smaller and weaker parts could be packed closer together. If it should be desirable to manufacture this mincing-knife, having a solid shank, and with the legs and blades radiating in this way, it might be done at less expense than could be done in sections. In that case fig. 1 represents a perspective view of a mincing-knife having the shank and legs or branches made solid, *a* representing the solid shank, and *b b* the legs or branches, said legs terminating at their lower ends in the feet *k*, having vertical longitudinal slots, *l*, (see fig. 8,) cut in them of sufficient width and depth to insert the blades *c c*, which may be secured in place by means of either screws, rivets, or solder, or they may be so secured as to swing a little loose upon their pivots, as may be convenient or desirable. A hole may be made through or into the handle C, into which may be inserted the upper part of the shank *a*, which may be either riveted into the wooden handle C, or secured in any desirable method.

It will be seen that in this manner of making a mincing-knife, whether constructed with a solid or sectional shank, the blades *c c* radiate from or run inwards towards a common centre, although they do not extend to or reach such centre, but stop short of it some little distance, thus leaving an open or clear space behind each and all of the blades, the inner end of said blades being made sharp, if desirable, in order to give them more cutting or mincing capacity. This peculiarity in the construction of a mincing-knife is a particular feature in my invention, and greatly facilitates the operation of mincing meat, as the meat as it becomes finer, is free to rise up through this central open space, and outwards again between the knives *c c* and branches *b b*, and thus the whole force of the blow given in mincing is expended upon the meat by the cutting edges of the blades. The peculiar manner in which the knives are grouped or placed, and also their peculiar shape, render it both desirable and advantageous for use, as it more nearly conforms to the shape of the bottom of the common mincing-bowl than any other mincing-knife in use. I am aware that hand-mincing knives have been made having a straight, solid, cylindrical shank, and having the knives placed in a radial form, and having the blades inserted into the lower end of such shank; but I am convinced that there are manifest disadvantages in such constructed mincing-knives, as the shank extending down to the knives is more or less blunt, and prevents the blades from operating as fully as they would do if there were a clear, open space around each blade. Knives constructed in that way are also more liable to clog in the operation of mincing, and, as they cannot be so easily and thoroughly cleaned after use, are more liable to rust; and I disclaim any and all such devices, so far as relates to the placing of knives in a radial position, irrespective of my arrangement and construction. I do not wish to confine myself to this particular shape of the inner end of the blades in my invention, as, instead of being perpendicular at the back or inner end, they may be sloped from the upper to the lower edge, either inwards or outwards, as experience may seem to require, and if such sloped end is made sharp, it will greatly increase its cutting capacity.

Having thus described my invention, what I claim as new, and desire to secure by Letters Patent, is—

A hand-mincing knife having a shank constructed solid or in sections, and terminating in the radial curved arms *b b*, in combination with the blades *c c*, so applied to the said arms *b b* as to leave an open central space, the whole constructed and arranged substantially as described and for the purpose herein set forth.

HELEN M. REMINGTON.

Witnesses:
J. P. BUCKLAND,
T. W. MANN.